No. 622,086. Patented Mar. 28, 1899.
P. SICOTTE.
SAW SETTING MACHINE.
(Application filed May 10, 1898.)
(No Model.) 2 Sheets—Sheet 1.

WITNESSES:
Edward Thorpe

INVENTOR
P. Sicotte.
BY
ATTORNEYS.

No. 622,086. Patented Mar. 28, 1899.
P. SICOTTE.
SAW SETTING MACHINE.
(Application filed May 10, 1898.)
(No Model.) 2 Sheets—Sheet 2.
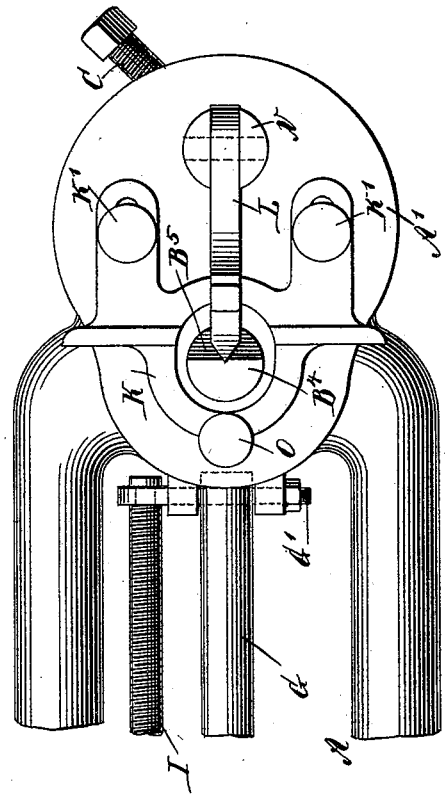
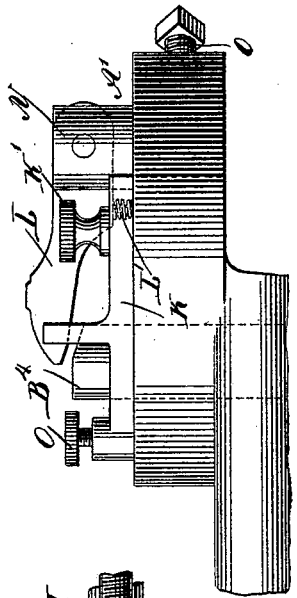
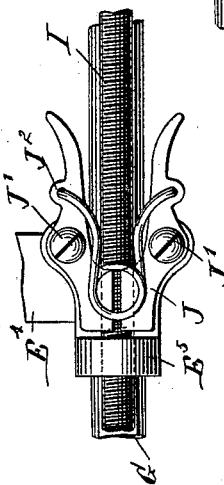
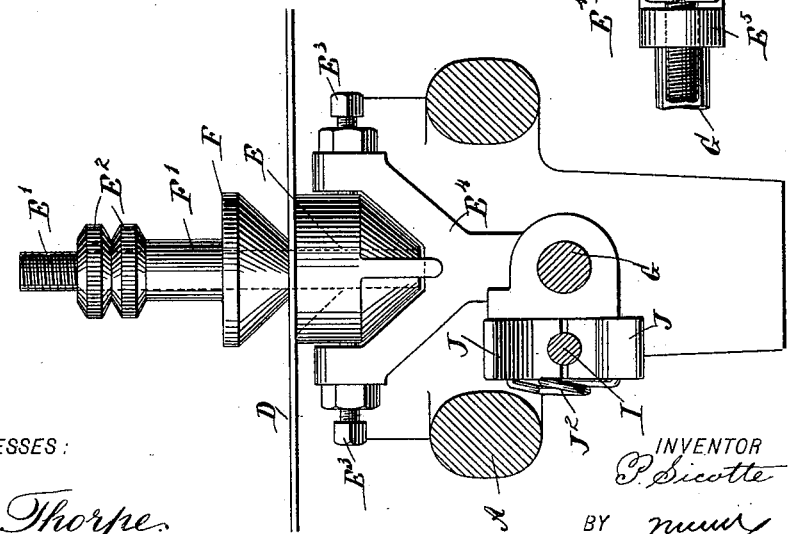
WITNESSES: Edward Thorpe
INVENTOR P. Sicotte
BY
ATTORNEYS.

UNITED STATES PATENT OFFICE.

PIERRE SICOTTE, OF LANSING, KANSAS, ASSIGNOR TO HIMSELF, AND HENRY J. HELLMERS, JR., OF LEAVENWORTH, KANSAS.

SAW-SETTING MACHINE.

SPECIFICATION forming part of Letters Patent No. 622,086, dated March 28, 1899.

Application filed May 10, 1898. Serial No. 680,303. (No model.)

*To all whom it may concern:*

Be it known that I, PIERRE SICOTTE, of Lansing, in the county of Leavenworth and State of Kansas, have invented a new and Improved Saw-Setting Machine, of which the following is a full, clear, and exact description.

The object of the invention is to provide a new and improved saw-setting machine more especially designed for setting the teeth of circular and hand saws in a very simple manner and without requiring the services of a skilled mechanic.

The invention consists of novel features and parts and combinations of the same, as will be fully described hereinafter and pointed out in the claims.

Reference is to be had to the accompanying drawings, forming a part of this specification, in which similar characters of reference indicate corresponding parts in all the figures.

Figure 1:
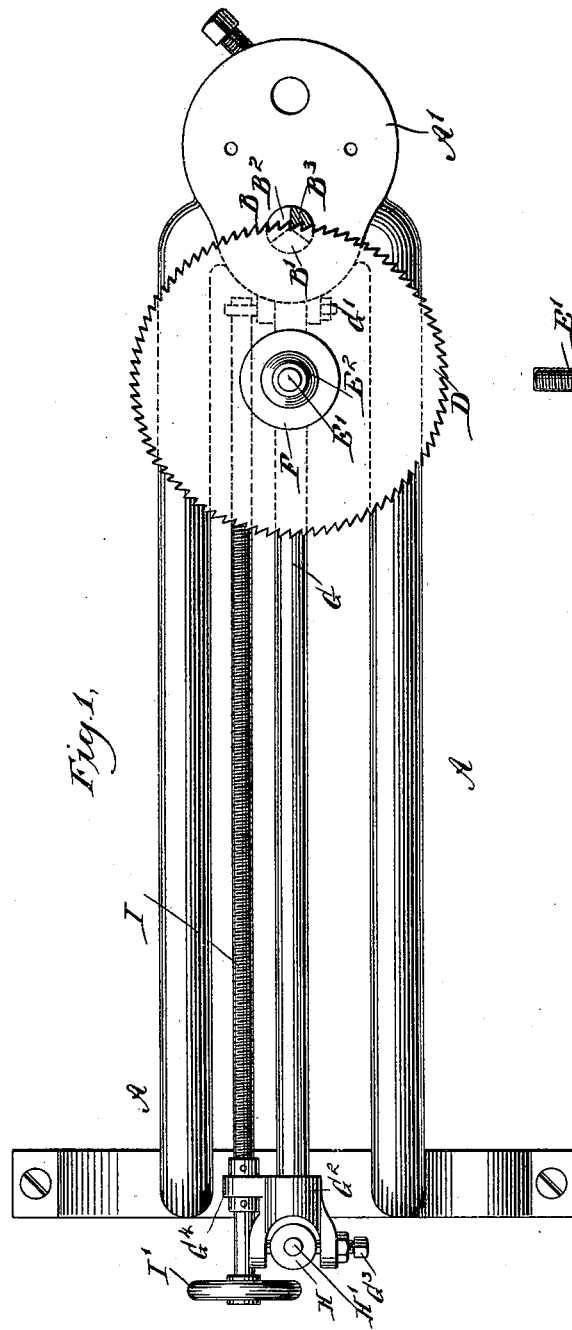
Figure 2:
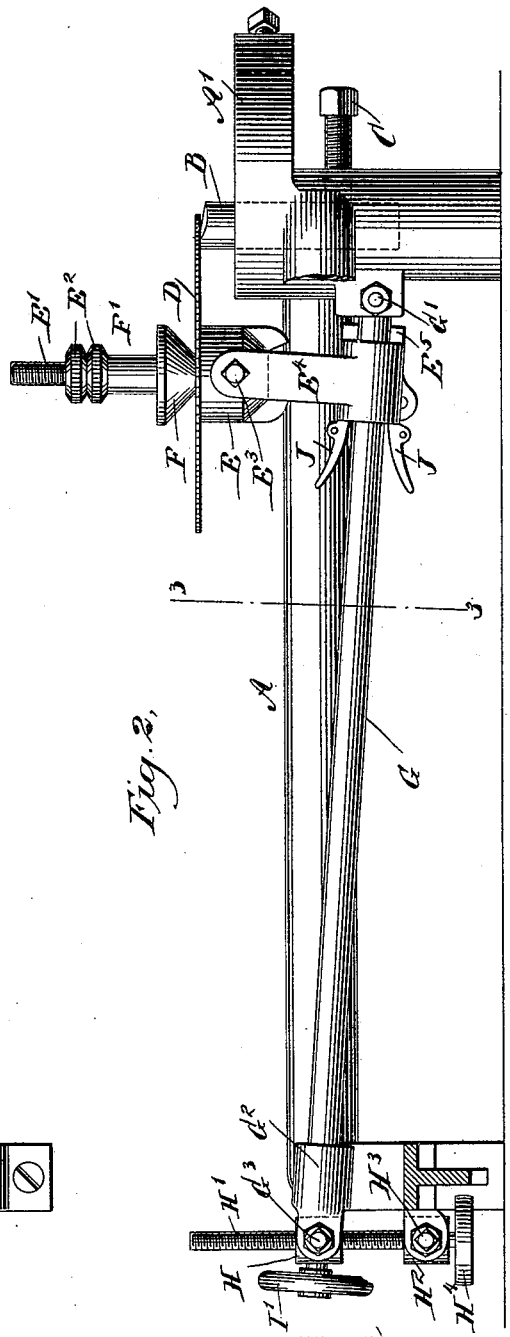

Figure 1 is a plan view of the improvement. Fig. 2 is a side elevation of the same. Fig. 3 is an enlarged transverse section of the same on the line 3 3 of Fig. 2. Fig. 4 is an enlarged rear elevation of the device for adjusting the saw-carrier. Fig. 5 is an enlarged plan view of the improvement as arranged for setting handsaws, and Fig. 6 is a side elevation of the same.

The improved saw-setting machine is provided with a suitably-constructed frame A, formed at one end with a table A', in which is fitted to slide vertically an anvil B, adapted to be secured in place by a set-screw C, as is plainly illustrated in Fig. 2. The top face of the anvil B is provided on its forward half with a horizontal surface B', from which extend in opposite directions the bevels $B^2 B^3$, on which alternate saw-teeth are set, as hereinafter more fully described. The under side of a circular saw D rests on the face portion B' to bring its teeth over the bevels $B^2$ and $B^3$, as plainly indicated in Figs. 1 and 2, and said circular saw D rests on the top of a saw-rest E, which forms part of the saw-carrier, the saw being centered on said carrier by means of a centering-cone F, held loosely on a screw-rod E', projecting upwardly from the rest E. The shank F' of the cone F is adapted to be engaged by a nut $E^2$ for holding the cone in place relatively to the saw to allow of turning the latter on the cone to bring the teeth in proper relation to the corresponding bevels $B^2 B^3$. A jam-nut is usually employed for locking the nut $E^2$ in place after the cone F is once adjusted for a particular saw.

The saw-rest E is hung on centers $E^3$, carried by the saw-carrier frame $E^4$, fitted to slide longitudinally on a guide G in the form of a rod fulcrumed at G' on the frame A near the table A'. The outer or free end of the guide G is provided with a forked head $G^2$, carrying centers $G^3$, engaging a nut H, screwing on a screw-rod H', mounted to turn in a bearing $H^2$, hung on centers $H^3$, carried by the outer end of the frame A. On the lower end of the screw-rod H' is secured a hand-wheel $H^4$, adapted to be taken hold of by the operator for turning the screw-rod H' in its bearing $H^2$ to move the nut H up or down to bring the guide-rod G in the same direction, according to the direction in which the hand-wheel $H^4$ is turned. By this arrangement the guide G and the carrier, together with the saw, are raised or lowered to bring the saw in proper relation relatively to the face of the anvil B, it being understood that the saw-carrier is adjusted longitudinally on the guide G, according to the diameter of the saw, so as to bring the teeth over the bevels of the anvil.

In order to obtain a minute adjustment of the carrier to accurately bring the saw-teeth over the bevels $B^2 B^3$, I provide a screw-rod I, mounted to turn at one end in the pivot G', the other end of the screw-rod being mounted to turn loosely in an offset $G^4$, projecting from the head $G^2$ of the carrier-guide. A hand-wheel I' on the outer end of the screw-rod I permits of turning the same and moving a nut J longitudinally on the said screw-rod, and as the said nut is held on the carrier-frame $E^4$ it is evident that the latter moves with the nut. The nut J is made in two sections, as is plainly illustrated in Fig. 4, the sections being pivoted at J' to the saw-carrier frame and are formed with handles adapted to be taken hold of by the operator to swing the nut-sections apart and disengage the nut from the threads of the screw-rod. Normally, however, the nut-sections are in engagement with the screw-rod I by the action of a spring J². The screw-rod I is guided loosely in a bearing E⁵ on the carrier-frame E⁴.

Now when it is desired to shift the saw-carrier the operator takes hold of the handles of the nut-sections and presses the same to disengage the threads of the screw-rod, and at the same time pulls on the handles to shift the saw-carrier frame longitudinally on its guide G until the saw is about in proper position relatively to the anvil. The operator then releases the sections of the nut J to permit said sections to again engage the threads of the screw-rod. He now turns the hand-wheel I', and consequently the screw-rod I, so as to shift the nut J, and with it the saw-carrier frame E⁴, to adjust the saw minutely and bring the teeth in proper relation to the bevels B² and B³ of the anvil B.

When the saw is in the position shown in Fig. 1, every alternate tooth is set on the bevel B³, and when these teeth have all been set the saw D is reversed, and then the remaining teeth are set on the bevel B². It is understood that by the arrangement described a most accurate setting of the teeth takes place, it requiring no further adjustment of the saw to set both sets of teeth, but merely a reversing of the saw, as mentioned.

The device is very simple and durable in construction, is not liable to get out of order, and can be readily manipulated by almost any person having some skill in mechanics.

In order to set the teeth of handsaws, I employ an anvil B⁴ on the table A', the said anvil having only its face portion B⁵ beveled for setting the teeth, the remaining flat horizontal portion forming a rest for the saw-blade. The saw carrier and gage K is adjustably held on the table A' and is secured in place thereon by set-screws K' after the adjustment is made to bring the teeth of the blade in proper relation to the bevel B⁵. A hammer or setting-tool L is pivoted on a rod N, held vertically adjustable in the table A', and the free end of said hammer extends over the bevel B⁵ to engage the saw-tooth to be set. The hammer is normally held in an uppermost position by a spring L' to permit of readily bringing the saw-tooth between the bevel B⁵ and the free end of the hammer. The latter is now given a blow with an ordinary hammer to bend the corresponding tooth onto the bevel B⁵, thus setting this tooth. Every alternate tooth is treated in this manner, and when these teeth have all been set then the saw is reversed and the remaining teeth are set in a like manner. The saw-carrier K is provided with a screw O to bring the saw-blade in proper position relative to the anvil-face.

Having thus fully described my invention, I claim as new and desire to secure by Letters Patent—

1. A saw-setting machine, comprising a frame, a saw-carrier guide pivoted at one end to the frame and carrying a swinging nut at the other end, an adjusting-screw engaging with said nut, a saw-carrier slidable on the guide and means for imparting a minute adjustment to the carrier, substantially as specified.

2. A saw-setting machine, comprising a frame, a saw-carrier guide pivoted at one end to the frame, a head on the other end of said guide, a nut mounted to swing in said head, an adjusting-screw engaging with the nut, a saw-carrier slidable on the guide, a screw-rod having one end engaged loosely in an offset of the guide-head, and a nut with which the screw-rod engages the said nut being connected to the carrier, substantially as specified.

3. A saw-setting machine, provided with an anvil, a saw-carrier, a support and guide for the same, adapted to be raised or lowered to bring the saw in proper position relative to the anvil, a screw-rod arranged alongside said guide and moving with the same, and a nut consisting of two spring-pressed sections adapted to be opened and closed on said screw-rod, and connected with said carrier, to move the same on the guide-rod either by hand or by the turning of said screw-rod, substantially as shown and described.

4. A saw-setting machine, provided with a pivoted saw-carrier guide, a saw-carrier slidable on the guide, means for imparting a swinging motion to the guide and holding the same in the adjusted position, a turnable screw-rod arranged alongside the said guide, and moving with the same in an up-and-down direction, and a nut consisting of two spring-pressed sections carried by said saw-carrier, and adapted to open and close on the said screw-rod, substantially as shown and described.

PIERRE SICOTTE.

Witnesses:
DAN STORRS,
W. A. MORGAN.